(12) United States Patent
Taneja et al.

(10) Patent No.: US 10,872,105 B2
(45) Date of Patent: Dec. 22, 2020

(54) METHOD TO IDENTIFY AND EXTRACT FRAGMENTS AMONG LARGE COLLECTIONS OF DIGITAL DOCUMENTS USING REPEATABILITY AND SEMANTIC INFORMATION

(71) Applicant: Adobe Inc., San Jose, CA (US)

(72) Inventors: Salil Taneja, Noida UP (IN); Arneh Jain, Kozhikode-Kerala (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/729,833

(22) Filed: Oct. 11, 2017

(65) Prior Publication Data

US 2019/0108277 A1 Apr. 11, 2019

(51) Int. Cl.
| | | |
|---|---|---|
| *G06F 40/14* | (2020.01) | |
| *G06F 16/335* | (2019.01) | |
| *G06F 16/93* | (2019.01) | |
| *G06F 16/332* | (2019.01) | |
| *G06F 16/31* | (2019.01) | |
| *G06F 40/131* | (2020.01) | |
| *G06N 3/08* | (2006.01) | |

(52) U.S. Cl.
CPC .......... *G06F 16/335* (2019.01); *G06F 16/313* (2019.01); *G06F 16/3326* (2019.01); *G06F 16/93* (2019.01); *G06F 40/131* (2020.01); *G06F 40/14* (2020.01); *G06N 3/08* (2013.01)

(58) Field of Classification Search
CPC .... G06F 17/2229; G06F 40/14; G06F 40/131; G06F 16/313; G06F 16/3326; G06F 16/93; G06F 16/335; G06N 3/08
See application file for complete search history.

(56) References Cited

U.S. PATENT DOCUMENTS

| | | | | |
|---|---|---|---|---|
| 5,627,748 A | * | 5/1997 | Baker | ....... G09G 5/00 715/210 |
| 6,098,034 A | * | 8/2000 | Razin | ....... G06F 17/22 704/9 |

(Continued)

OTHER PUBLICATIONS

B'ez et al., "Indexing Structured Documents with Suffix Arrays," 2012 12th International Conference on Computational Science and Its Applications, Salvador, 2012, pp. 43-48.*

(Continued)

*Primary Examiner* — Maikhanh Nguyen

(74) *Attorney, Agent, or Firm* — Finch & Maloney PLLC

(57) ABSTRACT

A corpus of documents is processed using, for example, algorithms including deep learning and deep neural networks ("DNN"), to extract fragments across the corpus of documents. The extracted fragments can then be edited individually and referenced by a plurality of documents so that changes to the fragments are reflected universally across a corpus of documents efficiently. In one example case, a computer-implemented method is provided for extracting fragments in a digital document. The method includes indexing said document to generate a document element ID sequence; processing said document element ID sequence to generate at least one fragment candidate; processing said at least one fragment candidate to generate at least one respective fragment; and utilizing said at least one fragment to perform a reconstruction of said document.

19 Claims, 15 Drawing Sheets

(56) References Cited

U.S. PATENT DOCUMENTS

| | | | |
|---|---|---|---|
| 7,487,169 B2* | 2/2009 | Agarwal | H03M 7/30 |
| 7,602,785 B2* | 10/2009 | Dharmapurikar | H04L 45/7457 370/392 |
| 8,271,403 B2* | 9/2012 | Rieck | G06F 7/02 706/12 |
| 9,008,425 B2* | 4/2015 | Dejean | G06K 9/00463 382/175 |
| 9,135,249 B2* | 9/2015 | Dejean | G06F 16/93 |
| 9,760,546 B2* | 9/2017 | Galle | G06F 40/12 |
| 10,311,046 B2* | 6/2019 | Hunicken | G06F 16/2379 |
| 2003/0182279 A1* | 9/2003 | Willows | G06F 3/0237 |
| 2005/0195832 A1* | 9/2005 | Dharmapurikar | H04L 45/7457 370/395.31 |
| 2006/0112264 A1* | 5/2006 | Agarwal | H03M 7/30 713/150 |
| 2007/0013967 A1* | 1/2007 | Ebaugh | G06F 17/30613 358/448 |
| 2007/0150807 A1* | 6/2007 | Harrington | G06F 17/30011 715/234 |
| 2009/0024555 A1* | 1/2009 | Rieck | G06K 9/6201 706/54 |
| 2009/0313248 A1 | 12/2009 | Balachandran et al. | |
| 2010/0306260 A1* | 12/2010 | Dejean | G06K 9/00469 707/776 |
| 2014/0350917 A1* | 11/2014 | Galle | G06F 40/12 704/9 |

OTHER PUBLICATIONS

Flick et al., "Parallel distributed memory construction of suffix and longest common prefix arrays," SC '15: Proceedings of the International Conference for High Performance Computing, Networking, Storage and Analysis, Austin, TX, 2015, pp. 1-10.*

Kasai, T. et al., "Linear-time longest-common-prefix computation in suffix arrays and its applications", CPM 2001, 12 pages.

Mamber, Udi and Gene Myers, "Suffix arrays : A new method for on-line string searches", 1989, University of Arizona, 16 pages.

* cited by examiner

METHOD TO IDENTIFY AND EXTRACT FRAGMENTS AMONG LARGE COLLECTIONS OF DIGITAL DOCUMENTS USING REPEATABILITY AND SEMANTIC INFORMATION

FIELD OF THE DISCLOSURE

This disclosure relates to techniques for identifying and extracting fragments across large collections of digital documents using repeatability and semantic information. In particular, this disclosure relates to techniques for processing of digital form documents using algorithms including deep learning and deep neural networks ("DNN") to extract fragments across a corpus of such documents. The extracted fragments can then be edited individually and referenced by a plurality of documents so that changes to the fragments are reflected universally across a corpus of documents efficiently.

BACKGROUND

Modern machine learning techniques have led to a tremendous impact in computer vision applications. One such application is the conversion of archaic printed paper forms into HTML ("Hypertext Markup Language") (via document forms), a format more suitable for modern consumption. Automated identification of document forms may be efficiently achieved by processing an image of a document form using deep neural networks and identifying various texts, fields, widgets, tables, etc. and converting them into a structure, which carries a direct mapping to an HTML rendition. However, the process of document form identification is often error-prone and typically requires certain corrections and touching-up by the end user to bring the final HTML rendition to a publishable format. For end users who use this technology to convert a large number of printed documents into digital format, handling such editing on every converted document is a considerable challenge. Moreover, a change to a section or fragment of one document has to be made again, individually to each additional form document that includes that same section or fragment.

DETAILED DESCRIPTION

Figure 1A:
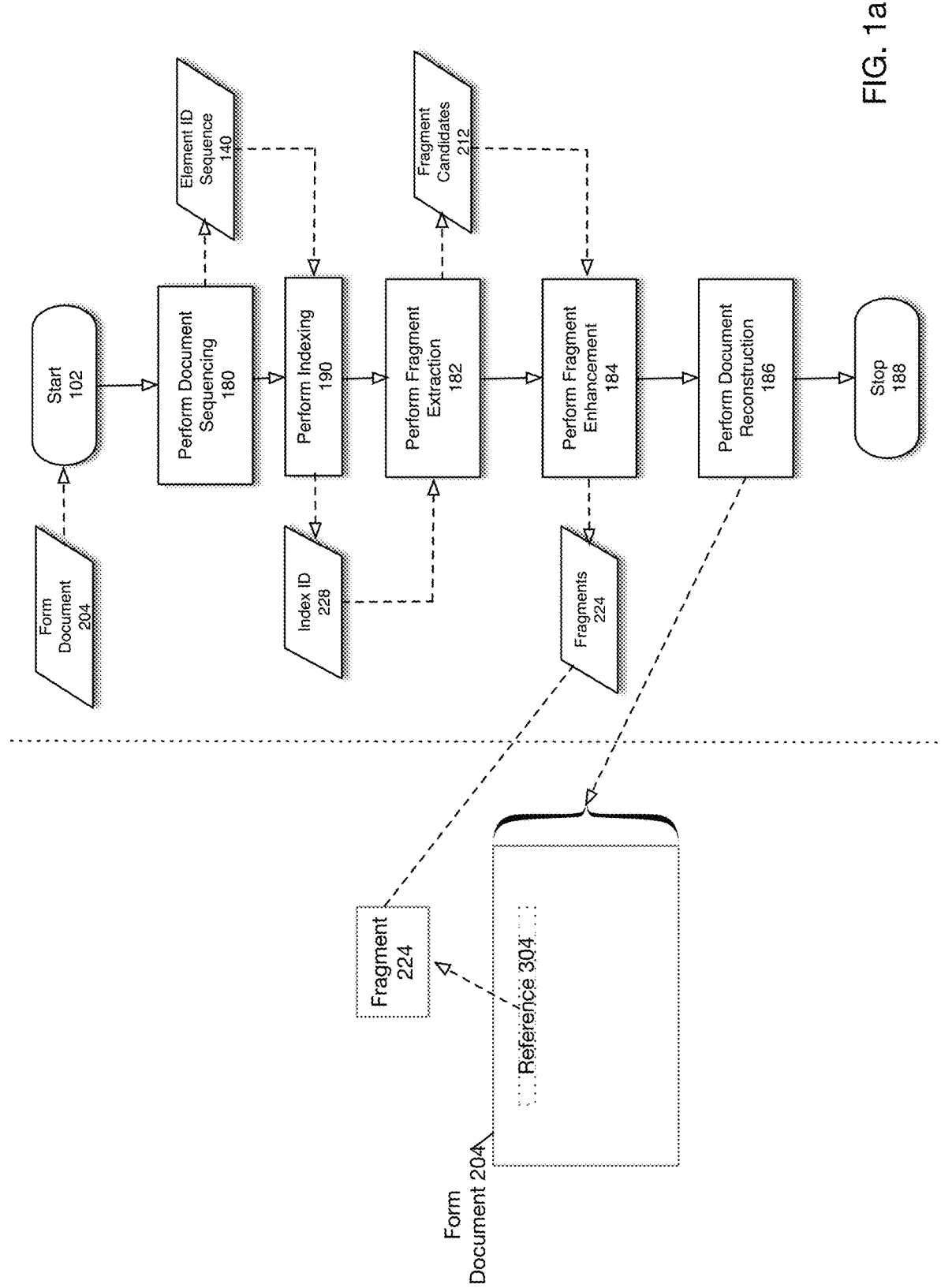
FIG. 1a is a flowchart depicting a fragment extraction and reconstruction process according to one embodiment of the present disclosure.

For purposes of this discussion a "form document" will be understood to be any document that may include any number of forms. The present disclosure relates to techniques that facilitate the detection of repeatable patterns herein referred to as "fragments" across a corpus of form documents. These fragments may then be extracted from the form documents in the corpus and any form documents including a particular fragment may be modified to include a reference to the fragment in place of the fragment itself. An editing interface and rendering interface may then treat such fragments as if they were the original elements such that they may be edited and rendered accordingly. In addition, if a user makes changes or corrections to a particular fragment, these changes are automatically reflected in the renditions across all of the form documents, according to some embodiments.

A structured document may comprise a set of components and subcomponents. For purposes of this discussion, a fragment is defined as a special type of subcomponent in the document. According to one embodiment of the present disclosure, a fragment may comprise any collection or subset of document elements such as text and widgets (e.g., pull-down menu, radio button, check box, or text input field, to name a few example widgets). For example, within a document a name text field followed by an input field for name followed by a phone number text field followed by an input field for phone number may appear. This pattern of document elements may occur in many different documents. To optimize the storage of documents embodying this repeating pattern of elements or fragment, the fragment may be detected and extracted. Each fragment may be represented by a data structure referred to herein as a fragment object, which may capture among other things, the pattern of repeating document elements.

A fragment may be viewed as a document in its own right or a sub-document, which describes the repeating pattern of document elements. Each fragment within a document may then be associated with a reference that points to a fragment object representing the fragment. When a document embodying a fragment is to be rendered, during a reconstruction process, upon detection of a reference to a fragment object, the referenced fragment object may be retrieved and the embodied document elements in the fragment object may then be rendered accordingly. So, for instance, when the corresponding fragment of a given document is amended, those changes are pushed to the corresponding fragment object. Likewise, changes made to that fragment object can be subsequently pushed to other documents at rendering time for those documents. Factors such as authorization to update the fragment object and/or when to access the fragment object to update a particular document may be user-configurable or otherwise settable, in some cases.

According to one embodiment of the present disclosure, identifying a repeating pattern of document elements as fragments may also be conditioned upon one or more constraints. These constraints may include, for example, the degree of repeatability of the pattern throughout the corpus of documents (e.g., number of occurrences of that pattern must be over a certain threshold) as well as a minimum or maximum size of the pattern (e.g., patterns less than 3 characters long may be ignored). Thus, for purposes of this discussion, a fragment may be defined as a sequence of unique document element IDs that repeat across the corpus of documents subject to one or more constraints such as repeatability and size.

Once a fragment extraction operation is completed for a given document, a set of potential fragments may then be generated across a corpus of documents based upon predetermined criteria such as repeatability. These fragments may then be edited independently. Any documents referencing such fragments may then automatically be updated in a consistent manner across a corpus of documents by virtue of editing a single fragment that may repeat across the corpus of documents. In some embodiments, owners of individual documents included in the corpus may be notified of the update and given a prompt or other means to accept or decline the change.

FIG. 1a is a flowchart depicting a fragment extraction and reconstruction process according to one embodiment of the present disclosure. It will be understood that a fragment extraction and reconstruction system (not shown in FIG. 1a) may operate on form documents 204 individually or upon a corpus of form documents in a batch mode of operation. For purposes of this example, it is assumed that a single form document 204 is to be processed. As shown in FIG. 1a, the process is initiated in 102. According to one embodiment, form document 204 may comprise an ordered sequence of document elements such as text fields, widgets allowing text entry or editing, etc. (not shown in FIG. 1a). Typically, such document elements may be arranged in a hierarchical fashion in which certain elements include other elements, which themselves may include yet other elements. An example form document 204 comprising a set of document elements is described below with respect to FIG. 3a.

A document repository (not shown in FIG. 1a) may comprise a set of form documents 204. Each of the form documents 204 in the document repository may be provided (as an image for example) to a machine learning algorithm which may utilize for example a DNN that detects and extracts document elements. As previously described document elements may be, for example, text fields, widgets such as radio buttons or text input fields, etc. Each document element may then be associated with a unique document element identifier ("ID"). For example, an address text element might be associated with the ID "1", whereas a name ID text element might be associated with the unique ID "2". These IDs are merely examples and any other naming convention is possible.

In this manner, for each form document 204, a sequence of unique document element IDs 140 is generated. The sequence of unique document element IDs 140 associated with the form document 204 is then provided to a fragment manager (not shown in FIG. 1a). The fragment manager first performs an indexing operation, which returns a unique ID 228 for a given form document 204 by parsing the sequence of unique document element IDs 140 in the form document 204.

In particular, in 180 a document sequencing operation is performed to generate document element ID sequence 140. During document sequence operation 180, document elements (not shown in FIG. 1a) in form document 204 are detected, extracted and serialized into appropriate data structures such as an array or linked list. Thus, element ID sequence 140 may comprise an array, linked list or other data appropriate data structure. In addition, as will be described below, a flattening operation (not shown in FIG. 1a) may also be performed to remove any hierarchical information inherent in document elements included in form document 204. The important point is that element ID sequence 140 may comprise an ordered list of document element identifiers corresponding to document elements in form document 204.

In 190, a document indexing operation is performed utilizing document element ID sequence 140 to generate index ID 228. Details of one embodiment for performing a document indexing operation are described below with respect to FIG. 3C. As will be described below with respect to FIG. 3C, the indexing operation performed in 190 may update appropriate data structures (described below) to account for element ID sequence 140 to facilitate a fragment detection and extraction operation (described below). According to one embodiment of the present disclosure, the indexing operation performed in 190 may update a suffix array and a special purpose data structure herein referred to as a generalized longest common prefix ("GLCP") array. Details regarding the nature of a suffix array and GLCP array are described below. The indexing operation performed in 190 may generate an index ID 228 corresponding to element ID sequence 140.

In 182 a fragment extraction process is performed utilizing index ID 228 to generate fragment candidates 212. As previously described, a fragment may comprise a subset of contiguous document elements that repeat across a corpus of documents. Details of one embodiment for performing a fragment extraction process are described below with respect to FIG. 4b.

Although fragment candidates 212 may satisfy basic requirements for classification as a fragment (i.e., repeatability across a corpus of documents, etc.), in certain cases certain identified fragment candidates 212 may have other attributes disqualifying them as fragments. Accordingly, fragment candidates 212 may then be filtered or curated via a fragment enhancement process in 184 to generate fragments 224. Details of one embodiment for performing a fragment enhancement process are described below with respect to FIG. 4a.

In 186 a document reconstruction is performed. Details of one embodiment for performing a document reconstruction process are described below with respect to FIGS. 5a-5c. The left pane of FIG. 1a depicts a document reconstruction process in which form document 204 may comprise one or more fragments 224. As shown by example in FIG. 1a, fragment 224 is replaced in form document 204 by reference 304, which references fragment 224. The process ends in 188.

Figure 1B:
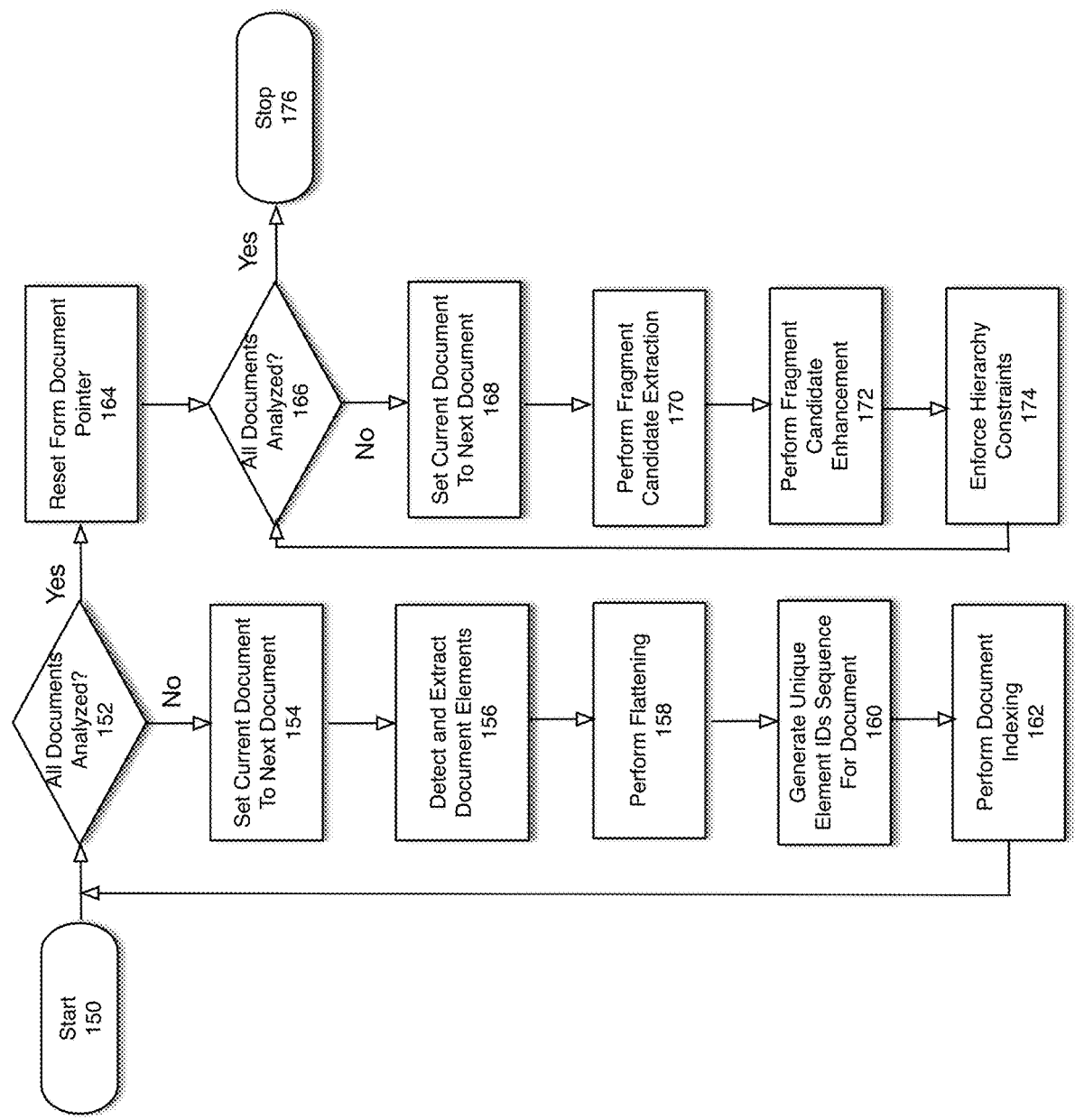
FIG. 1b is a flowchart depicting a detailed operation of a fragment extraction and reconstruction process according to one embodiment of the present disclosure.

FIG. 1*b* is a flowchart depicting a detailed operation of a fragment extraction and reconstruction process according to one embodiment of the present disclosure. For purposes of this example, it is assumed that a fragment extraction and reconstruction system (such as shown in FIG. 2 *a-b*) will perform a fragment extraction and reconstruction process as shown in FIG. 1 *b*. The process depicted in FIG. 1 *b* pertains to operation upon a corpus of form documents. However, it should be noted, that a similar process may be performed on a single form document 204 rather than a corpus of documents. The process is initiated in 150. In 152, it is determined whether all form documents 204 have been analyzed. If not ('No' branch of 152), in 154 the current form document is set to the next form document. In 156, all elements in the current document are detected and extracted from the current form document.

According to one embodiment of the present disclosure, the indexing and fragment extraction process is performed on non-hierarchical data. However, typically document elements may be hierarchical (e.g., may contain other elements). Thus, to facilitate the indexing and extraction process, in 158, a flattening operation may be performed on the element IDs extracted in 156. In 160, a unique element ID sequence 140 (not shown in FIG. 1*b*) for the current form document is generated. In 162, a document indexing operation is performed. As previously noted and as will be described below with respect to FIG. 3C, the indexing operation performed in 162 may update appropriate data structures (e.g., a suffix array and GLCP array) to account for the element ID sequence 140 generated in 160 (not shown in FIG. 1*b*) to facilitate a fragment detection and extraction operation (described below). Flow then continues with 152 in which the next document is analyzed.

If all documents have been analyzed ('Yes' branch of 152), in 164, the current form document is reset. In 166, is determined whether all documents have been analyzed. If so ('Yes' branch of 166) the process ends in 176. If not ('No' branch of 166), the current form document is set to the next form document in 168. A fragment candidate extraction process may then be performed in 170 to generate fragment candidates 212 (not shown in FIG. 1*b*). As previously described, a fragment may comprise a subset of contiguous document elements that repeat across a corpus of documents. A fragment candidate 212 (not shown in FIG. 1*b*) comprises one such contiguous set of document ID elements that may qualify as a true fragment subject to further analysis. Details of one embodiment for performing a fragment candidate extraction process are described below with respect to FIG. 4*b*.

Although fragment candidates 212 (not shown in FIG. 1*b*) may satisfy basic requirements for classification as a fragment (i.e., repeatability across a corpus of documents, etc.), in certain cases certain identified fragment candidates 212 may have other attributes disqualifying them as fragments. Accordingly, fragment candidates 212 (not shown in FIG. 1*b*) may then be filtered or curated via a fragment enhancement process. Accordingly, in 172, a fragment enhancement process is performed. Details of one embodiment for performing a fragment enhancement process are described below with respect to FIG. 4*a*.

As previously discussed, during the indexing and fragment extraction process any hierarchical information in a form document 204 may be flattened in order to facilitate an indexing operation. Once the fragment extraction process is complete, the hierarchical information is typically restored. Thus, in 174 hierarchy constraints are enforced to restore the hierarchy information. Flow then continues with 166 in which it is determined whether all documents have been analyzed.

Figure 2A:
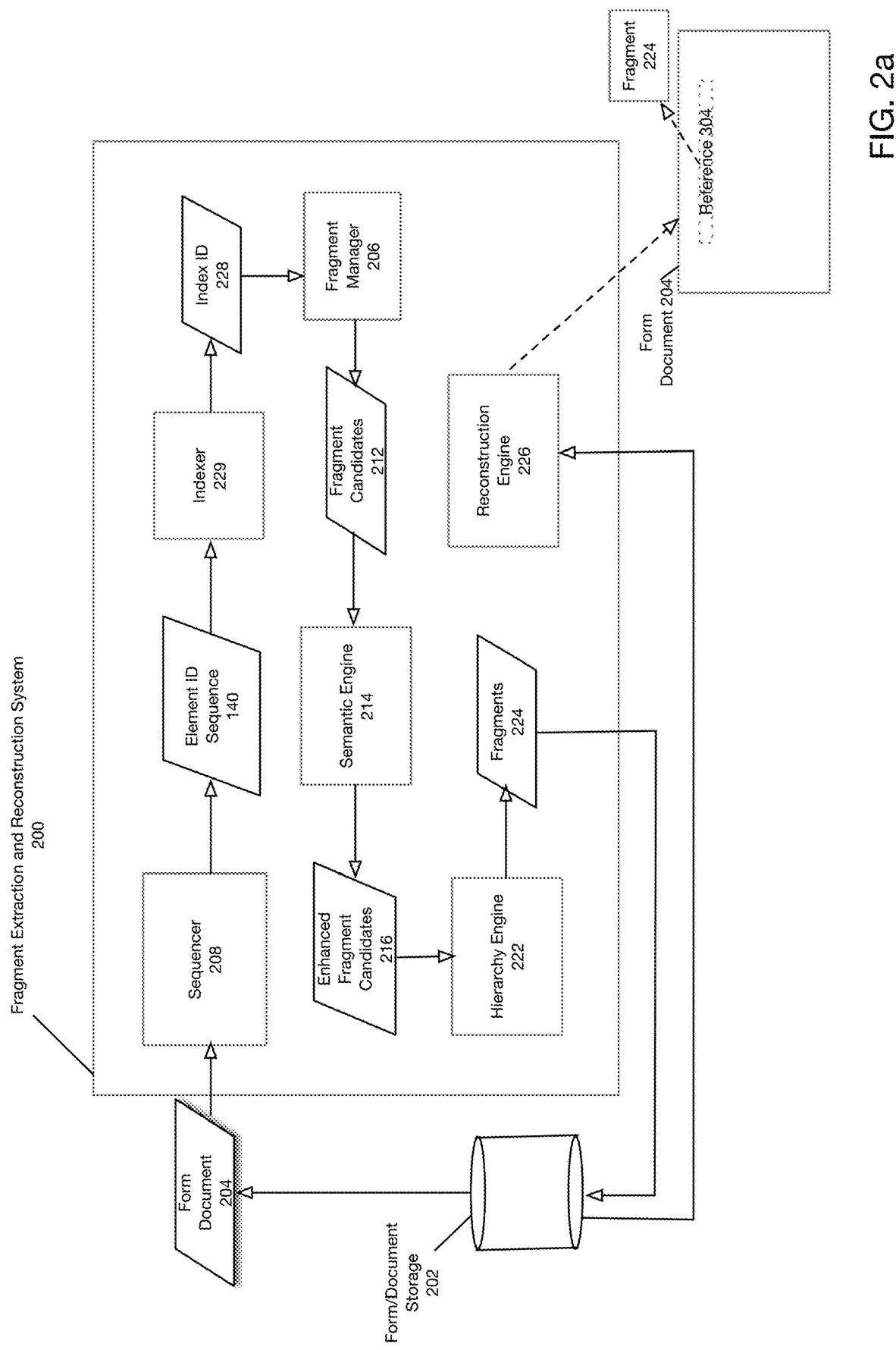
FIG. 2a is a block diagram of a fragment extraction and reconstruction system according to one embodiment of the present disclosure.

FIG. 2*a* is a block diagram of a fragment extraction and reconstruction system according to one embodiment of the present disclosure. Fragment extraction and reconstruction system 200 may operate to perform a fragment extraction and reconstruction process such as that depicted in FIGS. 1*a*-1*b*. As previously noted, fragment extraction and reconstruction system 200 may operate in a batch mode or may operate upon individual form documents 204. Fragment extraction and reconstruction system 200 may further comprise sequencer 208, indexer 229, semantic engine 214, fragment manager 206, hierarchy engine 222, and reconstruction engine 226. It will be understood that fragment extraction and reconstruction system 200 may further comprise other subsystems or may omit various subsystems shown in FIG. 2*a*.

Form document storage 202 may store a corpus of form documents 204 and existing fragments. Referring now to the operation of fragment extraction and reconstruction system 200, as shown in FIG. 2*a*, form document 204 may be received by fragment extraction and reconstruction system 200 from form document storage 202. Sequencer 208 may process form document 204 to generate element ID sequence 140. As previously noted, element ID sequence 140 may be flattened to remove hierarchical information although that operation is not explicitly depicted in FIG. 2*a*. Indexer 229 may then process element ID sequence 140 to generate index ID 228.

Fragment manager 206 receives index ID 228 and generates fragment candidates 212. A detailed structure of fragment manager 206 is depicted below with respect to FIG. 2*b*. Semantic engine 214 receives fragment candidates 212 to generate enhanced fragment candidates 216. In particular, according to one embodiment, fragment candidates 212 may not satisfy occurrence, size and other constraints specified by the end user.

These fragments are referred to as "candidates" because they might not make intuitive sense. This is primarily because if any sequence satisfies the size and occurrence constraints, all subsequences of this sequence with size greater than min_size would also satisfy the constraints. For example, it might occur in a document corpus that two fragment segments such as "Office Address" and "Home Address" might occur one after the other in multiple Forms/Documents. A fragment candidate 212 returned for such a case would be a union of the two. In order to address this, each fragment candidate 212 may be passed through an enhancement phase, which is performed by semantic engine 214. An operation and detailed structure of semantic engine 214 is described below with respect to FIG. 4*a*.

Hierarchy engine 222 receives enhanced fragment candidates 216 to generate fragments 224. Hierarchy engine 222 may operate to restore hierarchical information that was previously removed to facilitate indexing by indexer 229. Fragments 224 may then be stored in form document storage 202.

Reconstruction engine 226 may operate to retrieve and store fragments in form document storage 202 for various purposes. In particular, according to one embodiment fragments included in form document 204 may be replaced by a respective reference 304 that points to a particular fragment 224. Fragments stored in form document storage 202 may also be individually edited such that any edits are reflected across the corpus of documents by virtue of the fact that a single fragment may referenced by multiple documents across a corpus of documents.

Figure 2B:
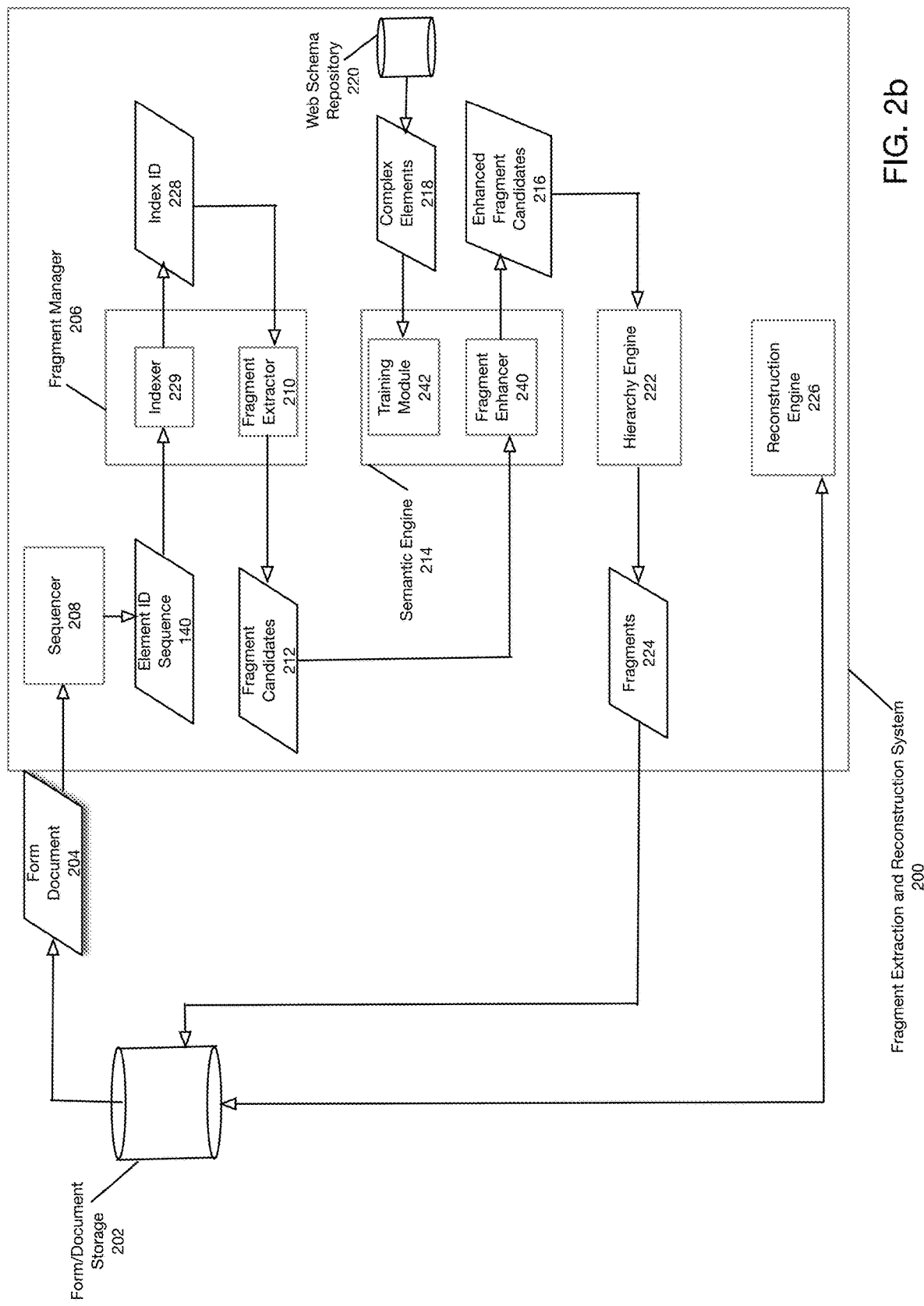
FIG. 2b is a detailed block diagram of a fragment extraction and reconstruction system according to one embodiment of the present disclosure.

FIG. 2b is a detailed block diagram of a fragment extraction and reconstruction system according to one embodiment of the present disclosure. Referring to FIG. 2b, fragment extraction and reconstruction system 200 may further comprise sequencer 208, semantic engine 214, fragment manager 206, web schema repository 220, hierarchy engine 222 and reconstruction engine 226. Fragment manager 206 may further comprise indexer 229 and fragment extractor 210. Semantic engine 214 may further comprise training module 242 and fragment enhancer 240. Much of the operation of fragment extraction and reconstruction system 200 shown in FIG. 2b is similar to that described with respect to FIG. 2a. However certain details and structure of fragment extraction and reconstruction system 200 are shown in more detail in FIG. 2b.

Referring to FIG. 2b, form document 204 may be retrieved from form document storage 202 and provided to sequencer 208. Sequencer 208 may process form document 204 to generate element ID sequence 140, which may be a flattened representation of document elements included in form document 204. Fragment manager 206 may then receive element ID sequence 140. In particular, indexer 229 in fragment manager 206 may process element ID sequence 140 to generate index ID 228. Fragment extractor 210 may then process index ID 228 to generate fragment candidates 212.

Fragment candidates 212 may then be provided to semantic engine 214. Semantic engine 214 may utilize various machine learning algorithms such as deep neural nets ("DNNs") to perform fragment enhancement. Thus, as shown in FIG. 2b, semantic engine 214 may undergo a training phase via training module 242 to learn how to perform fragment enhancement. According to one embodiment, training module 242 may utilize as training data complex elements 218 retrieved from a web schema repository 220. In particular, fragment enhancer 240 included in semantic engine 214 may process fragment candidates 212 to generate enhanced fragment candidates 216. Hierarchy engine 222 may then process enhanced fragment candidates 216 to generate fragments 224. Fragments may then be stored in form document storage 202. Reconstruction engine 226 may retrieve fragments 224 from form document storage 202 in order to perform document reconstruction.

Figure 3A:
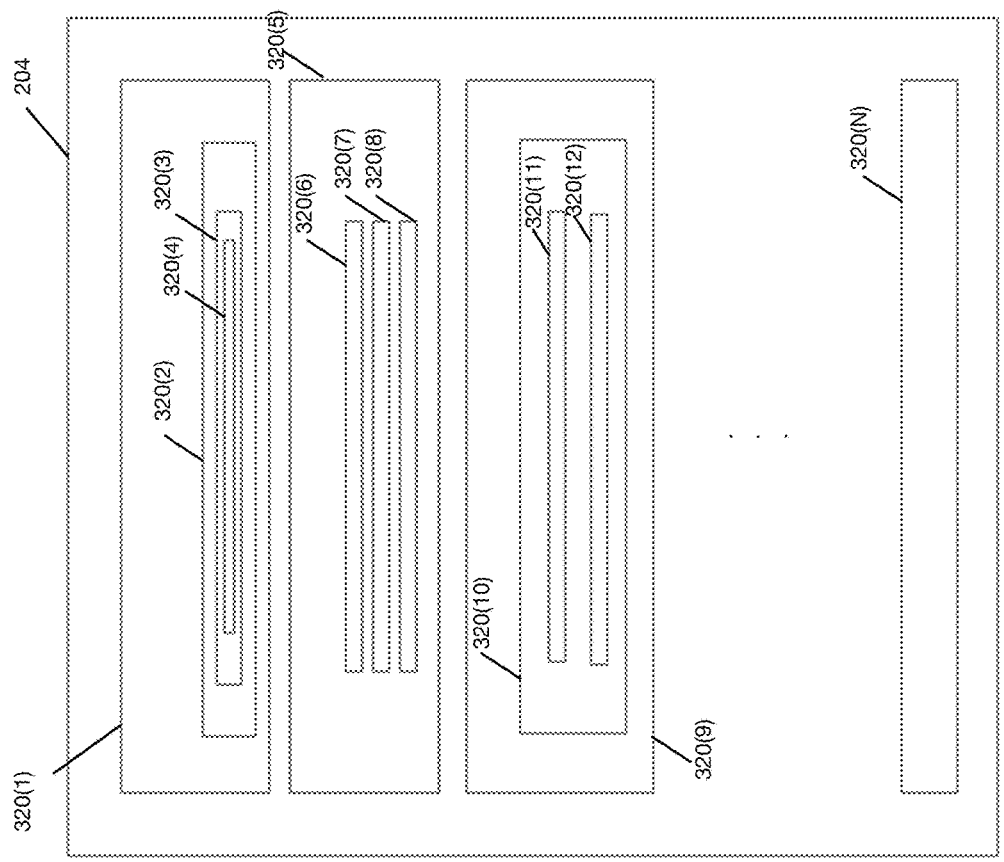
FIG. 3a depicts an example of a number of document elements included in a document within a hierarchical structure according to one embodiment of the present disclosure.

FIG. 3a depicts an example of a number of document elements included in a document within a hierarchical structure according to one embodiment of the present disclosure. Referring to FIG. 3a, form document 204 may comprise any number of document elements 320(1)-320(N). As previously described, document elements may comprise text fields, widgets such as text entry fields etc. As shown in FIG. 3a, document elements 320(1)-320(N) may further comprise other document elements which themselves may further comprise yet additional document elements. For example, document element 320(1) includes document element 320(2). Document element 320(2) further includes document element 320(3), which in turn includes document element 320(4). Similarly, document element 320(5) includes document elements 320(6)-320(8). Document element 320(9) includes document element 320(10), which further includes document elements 320(11)-320(12).

Figure 3B:
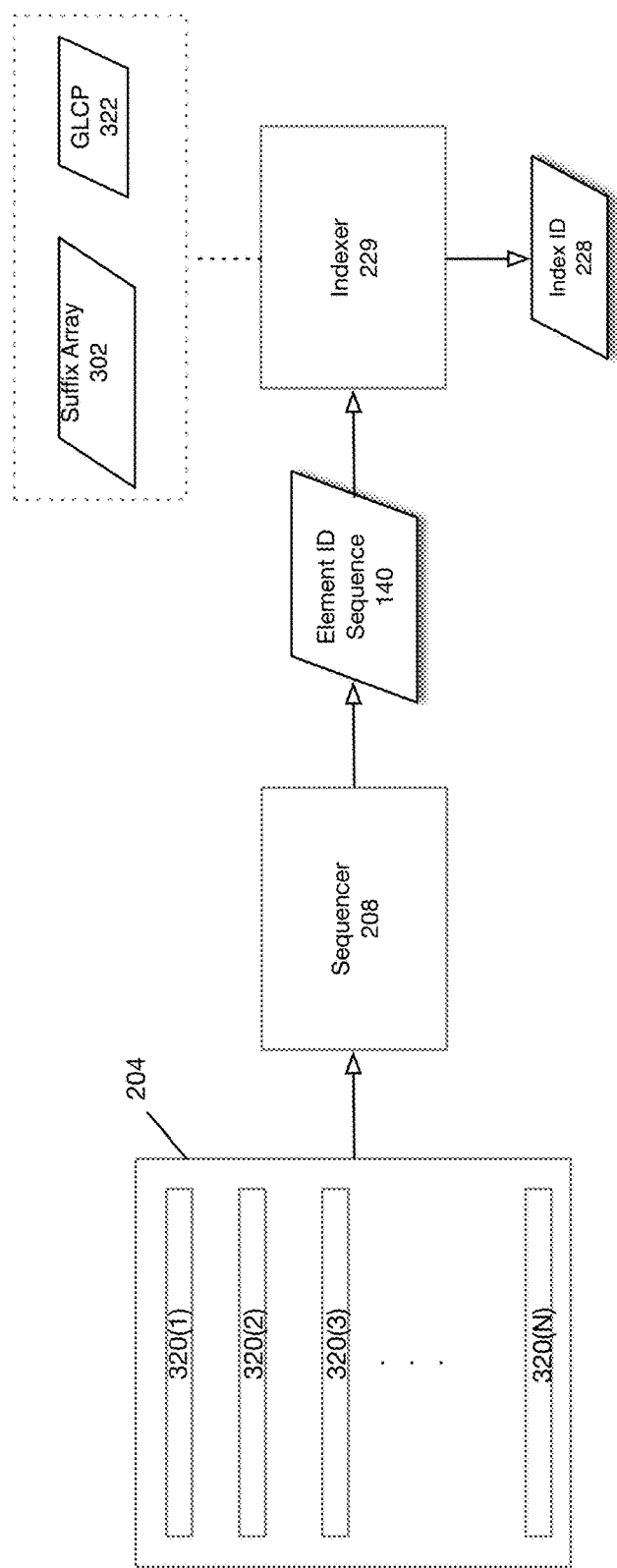
FIG. 3b schematically depicts an operation of a sequencer and indexer and associated data structures according to one embodiment of the present disclosure.

FIG. 3b schematically depicts an operation of a sequencer and indexer and associated data structures according to one embodiment of the present disclosure. As shown in FIG. 3b, form document 204 may comprise an arbitrary number of document elements 320(1)-320(N). Form document 204 is received by sequencer 208, which processes form document 204 to generate element ID sequence 140. Element ID sequence 140 is then received by indexer 229, which processes element ID sequence 140 to generate index ID 228. As shown in FIG. 3B, indexer 229 utilizes suffix array 302 and GLCP array 322 to perform an indexing operation (described below).

Various data structures utilized in performing an indexing operation will now be described.

Suffix Array

According to one embodiment of the present disclosure, suffix array 302 is a data structure that may be utilized in performing analysis on the sequence of strings. Suffix array 302 may comprise a sorted list of all suffixes of a given string. According to one embodiment of the present disclosure, suffix array 302 may be constructed in O(N) time, where N is the total number of elements present in suffix array 302. Additionally, since each and every suffix may be represented by its position alone, suffix array 302 requires only O(N) storage space. Together with an LCP array (described below), suffix array 302 may be utilized to efficiently compute various operations on string sequences.

For example, consider the string "banana". The suffixes of this string are:

| Index | Suffix |
| --- | --- |
| 0 | banana$ |
| 1 | anana$ |
| 2 | nana$ |
| 3 | ana$ |
| 4 | na$ |
| 5 | a$ |
| 6 | $ |

According to one embodiment of the present disclosure, "$" functions as a special symbol used to signify the end of the string. According to one embodiment of the present disclosure, the "$" symbol may be utilized to serve as a placeholder to distinguish between where a string ends and another starts. According to one embodiment of the present disclosure, the "$" may be represented as a −1* id value.

Thus, continuing with the above example, a suffix array 302 for the string "banana" may be constructed as follows:

| Index | Suffix Array | Corresponding Suffix |
| --- | --- | --- |
| 0 | 6 | $ |
| 1 | 5 | a$ |
| 2 | 3 | ana$ |
| 3 | 1 | anana$ |
| 4 | 0 | banana$ |
| 5 | 4 | na$ |
| 6 | 2 | nana$ |

The fact that $ corresponds to a −ve value, ensures that suffixes like 'ana$' come before 'anana$' in the suffix tree.

Position Array

According to one embodiment of the present disclosure, a helper position array which is used during the creation of suffix array 302 may be persisted for later use. The position array may be used to quickly determine the position of an input suffix sequence in an associated suffix array 302.

LCP Array

According to one embodiment of the present disclosure a longest common prefix ("LCP") array may store the longest common prefix between a suffix array's ith and (i+1)th elements. According to one embodiment, suffix array 302 and a LCP array may be utilized to determine various information relating to the sequences efficiently. For example, according to one embodiment of the present disclosure, the total number of times a particular sub-sequence occurs among a set of all sequences may be determined utilizing these data structures. The following shows an example of an LCP array corresponding to the string "banana".

| Index | Suffix Array | LCP Array | Corresponding Suffix | Next Suffix |
|---|---|---|---|---|
| 0 | 6 | 0 | $ | a$ |
| 1 | 5 | 1 | a$ | ana$ |
| 2 | 3 | 3 | ana$ | anana$ |
| 3 | 1 | 0 | anana$ | banana$ |
| 4 | 0 | 0 | banana$ | na$ |
| 5 | 4 | 2 | na$ | nana$ |
| 6 | 2 | — | nana$ | — |

GLCP Array

According to one embodiment of the present disclosure, identification of a sequence as a fragment requires that the sequence meet various constraints. In particular, according to one embodiment a min_size constraint and min_occur constraint are imposed. The min_size constraint requires a fragment to be of a minimum size (i.e., be comprised of a minimum number of document elements). The min_occur constraint, on the other hand, requires that the sequence be repeated at least a min_occur number of times across the corpus of documents.

According to one embodiment a generalized LCP ("GLCP") array 322 may be defined that facilitates application of the min_occur constraint for fragments. The ith element of a GLCP array 322 is the minimum among the {ith, ... (i+min_occur−2)th} elements of the LCP array (i.e., the minimum of min_occur−1 elements of the LCP array).

According to one embodiment, in order to generate GLCP array 322, a sliding window of size min_occur−1 is used to traverse an LCP array and assign the minimum of the elements included within that sliding window to the corresponding location of GLCP array 322. Thus, GLCP array 322 may be represented as:

$$GLCP[i] = \min_{0 \le x < minoccur-1} LCP[i+x]$$

Accordingly, the ith element of GLCP array 322 represents how many elements the suffix corresponding to the ith suffix array element have in common with the next min_occur elements. In other words, according to one embodiment, the ith element of a GLCP array 322 indicates the size of the maximum prefix that occurs at least min_occur times among the suffixes occurring after it. Accordingly, this property allows identification of fragments 224 that satisfy the min_occur constraint.

The following example illustrates a generation of suffix array 302, GLCP array 322 and an LCP array from the string "xabyabzab" with a min_occur constraint of 3.

| Index | Suffix Array | LCP Array | GLCP Array | Corresponding Suffix | Comments |
|---|---|---|---|---|---|
| 0 | 9 | 0 | 0 | $ | |
| 1 | 7 | 2 | 2 | ab$ | This represents that the substring 'ab' occurs at least 3 times. |
| 2 | 4 | 2 | 0 | abzab$ | |
| 3 | 1 | 0 | 0 | abyabzab$ | |
| 4 | 8 | 1 | 1 | b$ | This represents that the substring 'b' occurs at least 3 times. |
| 5 | 5 | 1 | 0 | bzab$ | |
| 6 | 2 | 0 | 0 | byabzab$ | |
| 7 | 0 | 0 | 0 | xabyabzab$ | |
| 8 | 3 | 0 | 0 | yabzab$ | |
| 9 | 6 | 0 | 0 | zab$ | |

Figure 3C:
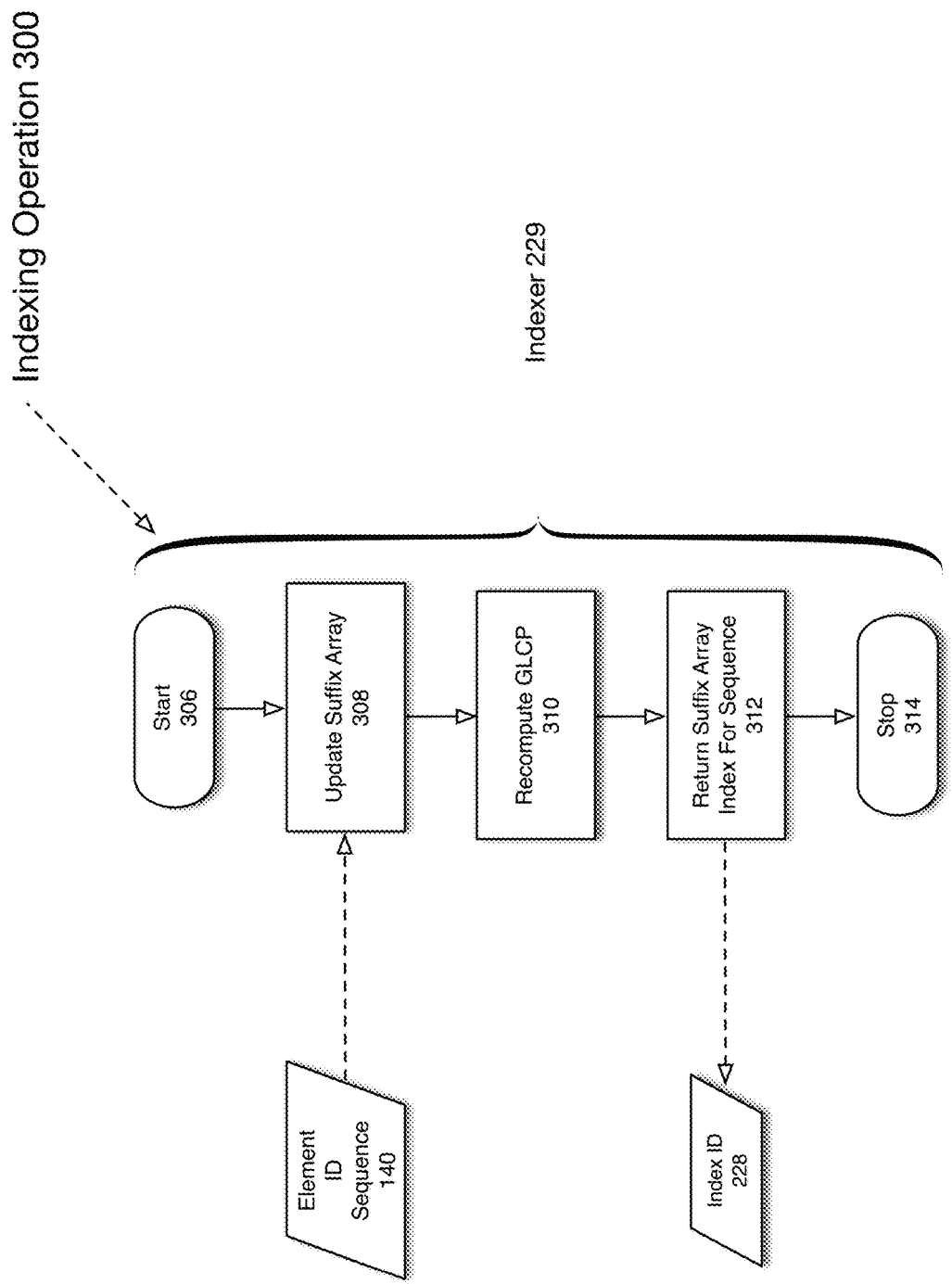
FIG. 3c is a flowchart depicting an indexing operation according to one embodiment of the present disclosure.

FIG. 3c is a flowchart depicting an indexing operation according to one embodiment of the present disclosure. Element ID sequence 140 is provided as input for indexing operation 300. The process is initiated in 306. In 308, suffix array 302 is updated. In 310, GLCP array 322 is recomputed. In 312 index ID 228 is returned for element ID sequence 140. The process ends in 314.

Figure 4A:
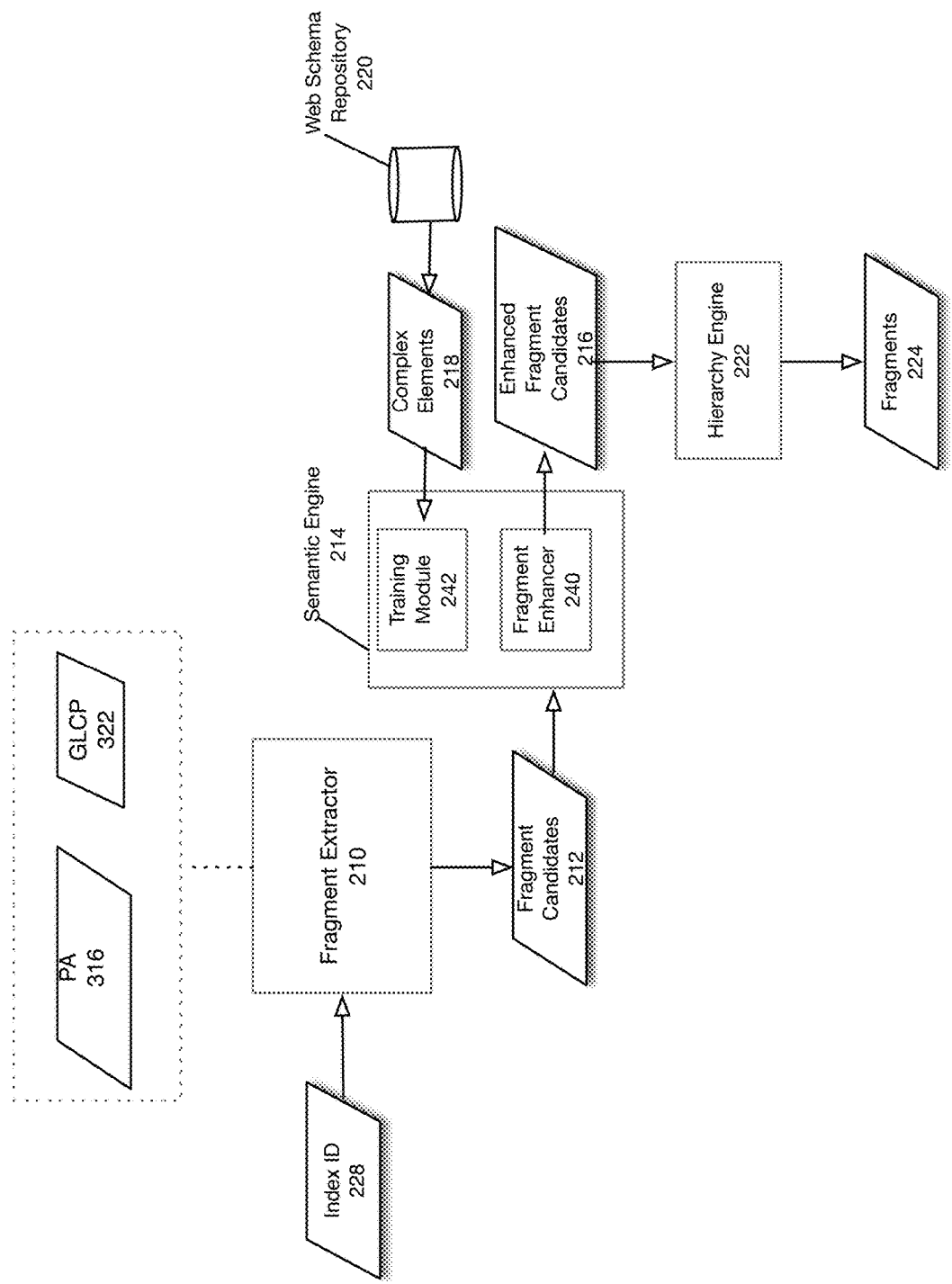
FIG. 4a schematically depicts an operation of a fragment extraction operation and associated data structures according to one embodiment of the present disclosure.

FIG. 4a schematically depicts an operation of a fragment extraction operation and associated data structures according to one embodiment of the present disclosure. In particular, as shown in FIG. 4a, fragment extractor 210 utilizes position array ("PA") 316 and GLCP array 322 in order to generate fragment candidates 212 using input from index ID 228. However, these fragment candidates 212 detected by fragment extractor 210 on the basis of repeatability, might not make intuitive sense. For example, the system may detect a combination of Personal Information, Home Address, and Office Address as a single fragment, if such a sequence occurs quite frequently in the input corpus. However, it is clear from a human perspective that these are three different fragments.

In order to address this issue, such fragment candidates 212 may be split into smaller candidates, on the basis of semantic analysis over them. Thus, according to one embodiment, semantic engine 214 may perform this function of refining fragment candidates 212 detected by fragment extractor to generate enhanced fragment candidates 216, for example, by utilizing a corpus of Form XML Schema Mappings obtained by crawling the Web by utilizing training module 242. However, any schema may be utilized and XML is only one example. According to one embodiment, the input to the semantic engine 214 may be detected fragment candidates 212.

According to one embodiment, semantic engine 214 may process fragment candidates 212 to output subsequences of enhanced fragment candidates 216 corresponding to a valid semantic mapping to a schema complex type (e.g.: Personal Details, Address Fields, etc.), which are herein referred to as enhanced fragment candidates 216. According to one embodiment, if no such mapping seems valid, it would return the original fragment candidate 212 as the output. Semantic engine 214 may further comprise training module 242 and fragment enhancer 240. Training module 242 may be trained utilizing complex elements 218 stored in web schema repository 220. Semantic engine 214 may implement a machine learning algorithm such as a deep neural net ("DNN") in order to perform fragment enhancement.

As will be appreciated in light of this disclosure, enhanced fragment candidates 216 are the result of deconstructing a complex fragment candidate 212 into two or more less complex (and thus, 'enhanced') fragment candidates 216. So, for instance, if a combination of Age, Home Address, and Office Address is identified as a single fragment candidate 212, semantic engine 214 may output three distinct enhanced fragment candidates 216, including Age, Home Address, and Office Address. The primary role of fragment enhancer 240 is to split an input sequence of fragment candidates 212 if a sub-sequence contains a close mapping to the one of the complex XML Schema elements. If no such mapping is found, fragment enhancer 240 returns the original fragment candidates 212 as the final fragment.

The advantage of such a step allows us to create user intuitive fragments which correspond to something meaningful. This also helps in ensuring a high repeatability for the detected fragments.

Figure 4B:
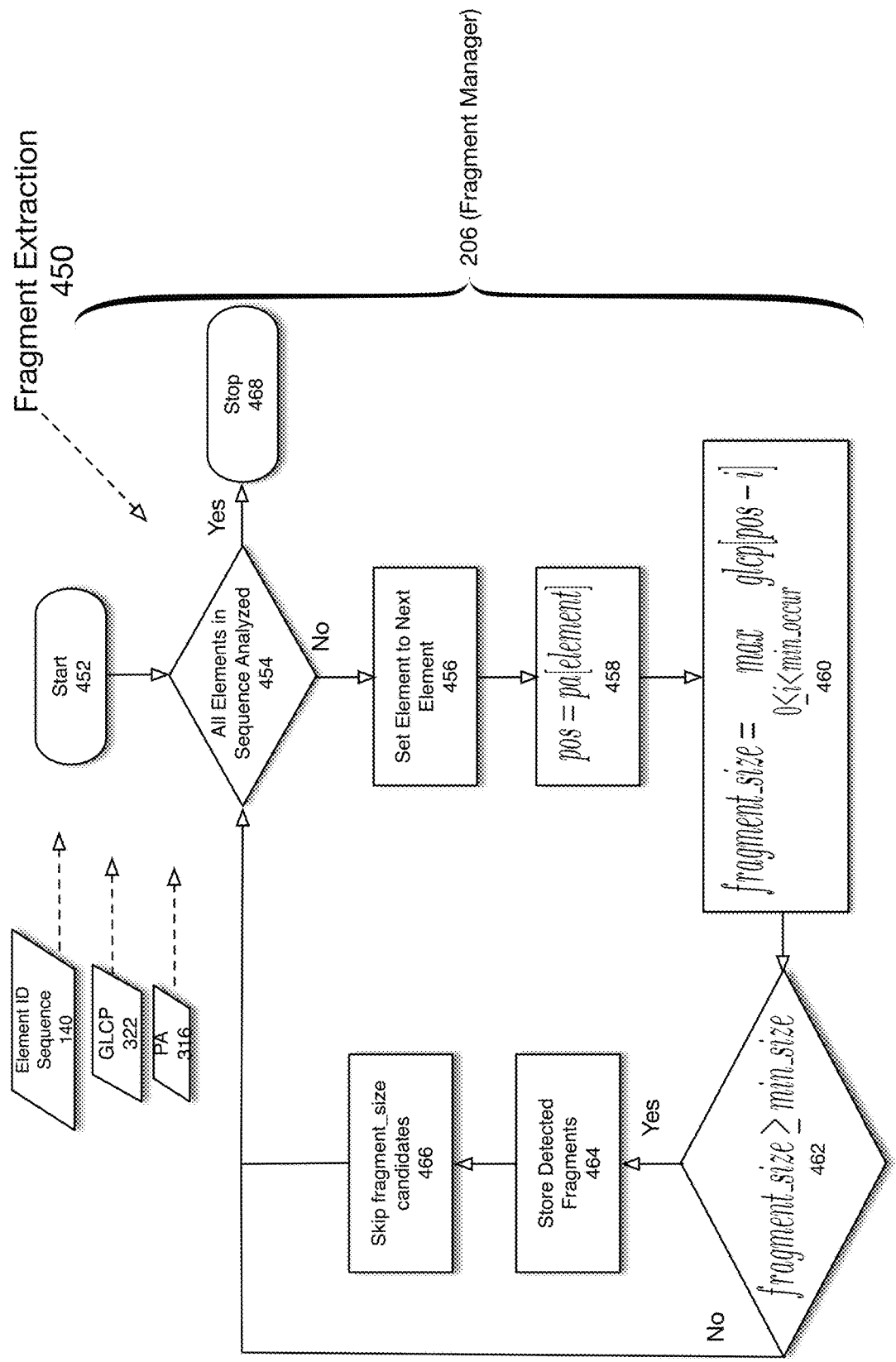
FIG. 4b is a flowchart of a fragment candidate detection processing according to one embodiment of the present disclosure.

FIG. 4b is a flowchart of a fragment candidate detection processing according to one embodiment of the present disclosure. Once all the documents in the corpus have been indexed, a fragment extraction operation is performed. The goal of the fragment extraction process is to leverage repeatability of fragments across the corpus of documents. According to one embodiment of the present disclosure, the extraction process utilizes two constraints, a minimum size constraint and a minimum occurrence constraint. The purpose of these constraints is to ensure that the system can work with manageable pieces.

According to one embodiment, the fragment extraction operation is able to determine, for example that a unique subsequence of document element IDs is repeated across a corpus of documents subject to the minimum size constraints and the minimum occurrence constraints. According to one embodiment of the present disclosure, the process shown in FIG. 4b extracts fragments having a size greater than min_size. It is further assumed that an output of the process shown in FIG. 4b is an array herein referred to as fragment_candidates, wherein each array element is a pair of the variables pos and fragment_size, where pos indicates a position of the fragment in GLCP array 322 and fragment_size is the size of the fragment. As previously discussed with respect to FIG. 4a, the min_occur constraint is enforced via the process depicted there.

As shown in FIG. 4b, the process is initiated in 452. According to one embodiment, fragment candidate detection process 450 may be implemented by fragment manager 206 and receives as input element ID sequence 140, GLCP array 322 and PA 316. In 454, it is determined whether all elements in the sequence have been analyzed. If so ('Yes' branch of 454), the process ends in 468. If not ('No' branch of 454) flow continues with 456 and the current element is set to the next element. In 458, the position in the GLCP array 322 of the current element is determined using PA 316. In 460, the maximum GLCP array entry between the current element and min_occur is determined and set to the variable fragment_size. In 462, it is determined whether the fragment_size is greater than a min_size. If not ('No' branch of 462) flow continues with 454. If so ('Yes' branch of 462), flow continues with 464 and the detected fragment is stored or marked. Flow then continues with 466 in which the next fragment_size candidates are skipped. Then 454 is executed to determine whether all elements in the sequence have been analyzed.

The following shows the process depicted in FIG. 4b in symbolic form.

---

Algorithm: Fragment Candidate Detection

---

Input: GLCP array, position_array, input_sequence
Output: fragment_candidates
   for element in input_sequence do:
      pos ← position_array[element]
      fragment_size ← $\max_{0 \leq i < minoccur}$ GLCP[pos − i]
      if fragment_size > min_size then
         store fragment
         skip fragment_size elements

---

The following example shows a fragment extraction operation process performed on the string "xabyabzab" according to one embodiment of the present disclosure.

| pos | GLCP Array | $\max_{0 \leq i < minoccur}$ GLCP[pos − i] | Corresponding Suffix | Comments |
|---|---|---|---|---|
| 0 | 0 | 0 | $ | |
| 1 | 2 | 2 | ab$ | Max over GLCP with index 0,1 |
| 2 | 0 | 2 | abzab$ | Max over GLCP with index 0,1,2 |
| 3 | 0 | 2 | abyabzab$ | Max over GLCP with index 1,2,3 |
| 4 | 1 | 1 | b$ | Max over GLCP with index 2,3,4 |
| 5 | 0 | 1 | bzab$ | |
| 6 | 0 | 1 | byabzab$ | |
| 7 | 0 | 0 | xabyabzab$ | |
| 8 | 0 | 0 | yabzab$ | |
| 9 | 0 | 0 | zab$ | |

For example, consider a document with unique document IDs A, B, C, D, E, F, G. Consider now, a second document that contains the sequence of unique document element IDs E, F, G. Assume further, that these two documents comprise the entirety of the corpus. In this instance, upon running the extract operation, the extract operation will return the subsequence E, F, G because this subsequence repeats across all of the documents in the corpus. The extract operation utilizes a corpus of documents and a given document to generate a set of repeating subsequences across the corpus of documents.

According to one embodiment, after fragment extraction is performed a reconstruction process is then performed. According to one embodiment of the present disclosure, for each document that includes a fragment, a reference corresponding to that fragment may be inserted in place of the fragment. In this manner, the entire system may receive a corpus of documents as input and provide as output another corpus of documents. According to one embodiment, the output corpus of documents may include the original documents such that in places where fragments occur a reference is provided to the fragment as well as the fragments themselves. Thus, according to one embodiment the output corpus of documents may include two types of documents: the original documents with the fragments replaced by references and the fragments themselves.

Figure 5A:
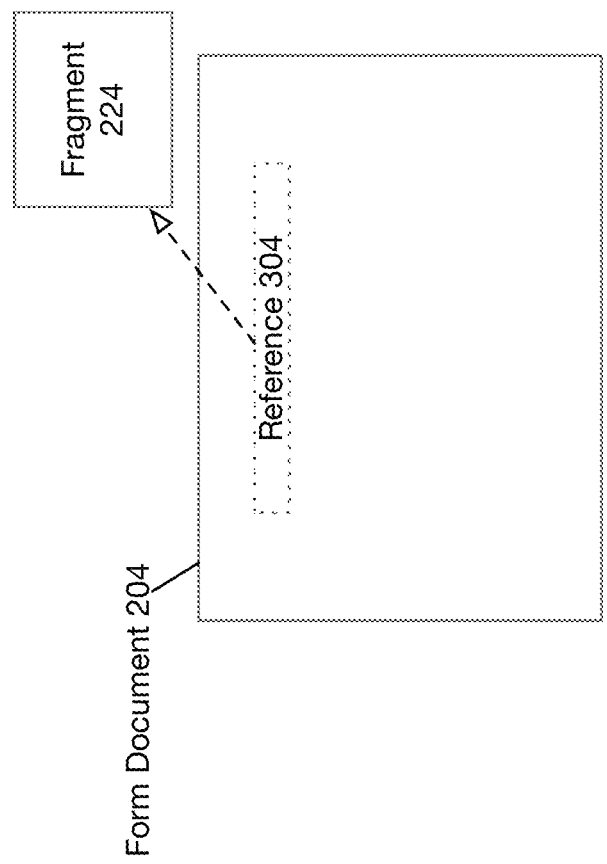
FIG. 5a depicts an example of a document referencing a fragment according to one embodiment of the present disclosure.

FIG. 5a depicts an example of a document referencing a fragment according to one embodiment of the present disclosure. As shown in FIG. 5a, form document 204 includes reference 304 that references fragment 224. In this manner, form document 204 need only store a reference to a fragment rather than the entire body of the fragment itself. Any modifications to fragment 224 will accordingly be reflected in form document 204.

Figure 5B:
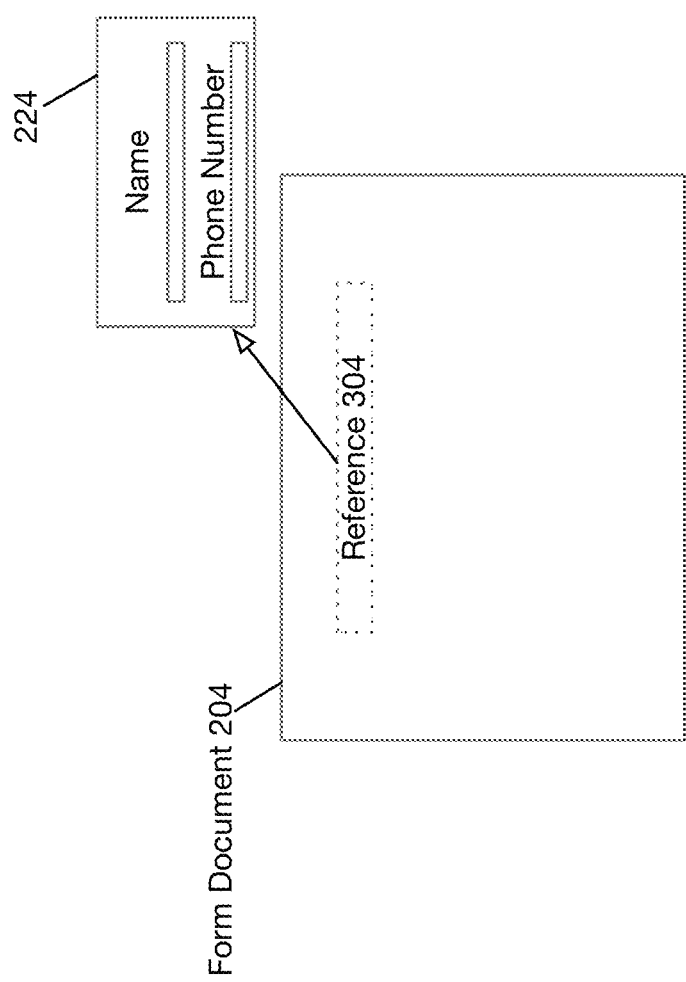
FIG. 5b depicts a more detailed example of a document referencing a fragment according to one embodiment of the present disclosure.

FIG. 5*b* depicts a more detailed example of a document referencing a fragment according to one embodiment of the present disclosure. The example shown in FIG. 5*b* is similar to that of FIG. 5*b* except fragment 224 illustrates two document elements (name and phone number). Thus, for example, a user might edit the name element or remove it. Any changes in fragment 224 would be reflected universally across the corpus of documents that reference fragment 224.

Figure 5C:
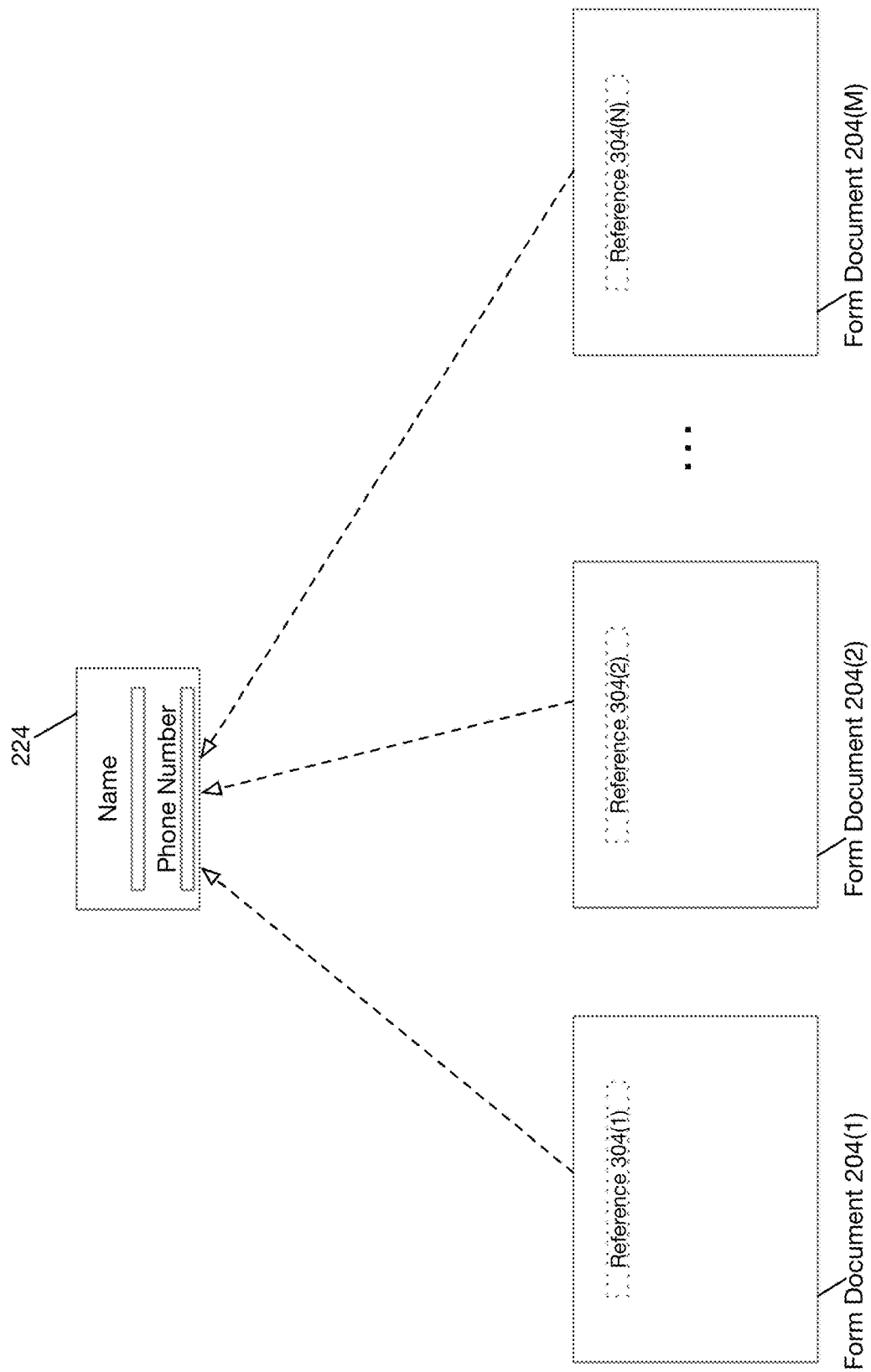
FIG. 5c depicts an example of multiple documents referencing a single fragment according to one embodiment of the present disclosure.

FIG. 5*c* depicts an example of multiple documents referencing a single fragment according to one embodiment of the present disclosure. As shown in FIG. 5*c*, form documents 204(1)-204(M) each reference the same fragment 224 via respective references 304(1)-304(N). Thus, any modifications to fragment 224 will be universally reflected across the corpus of documents 204(1)-204(M).

Figure 5D:
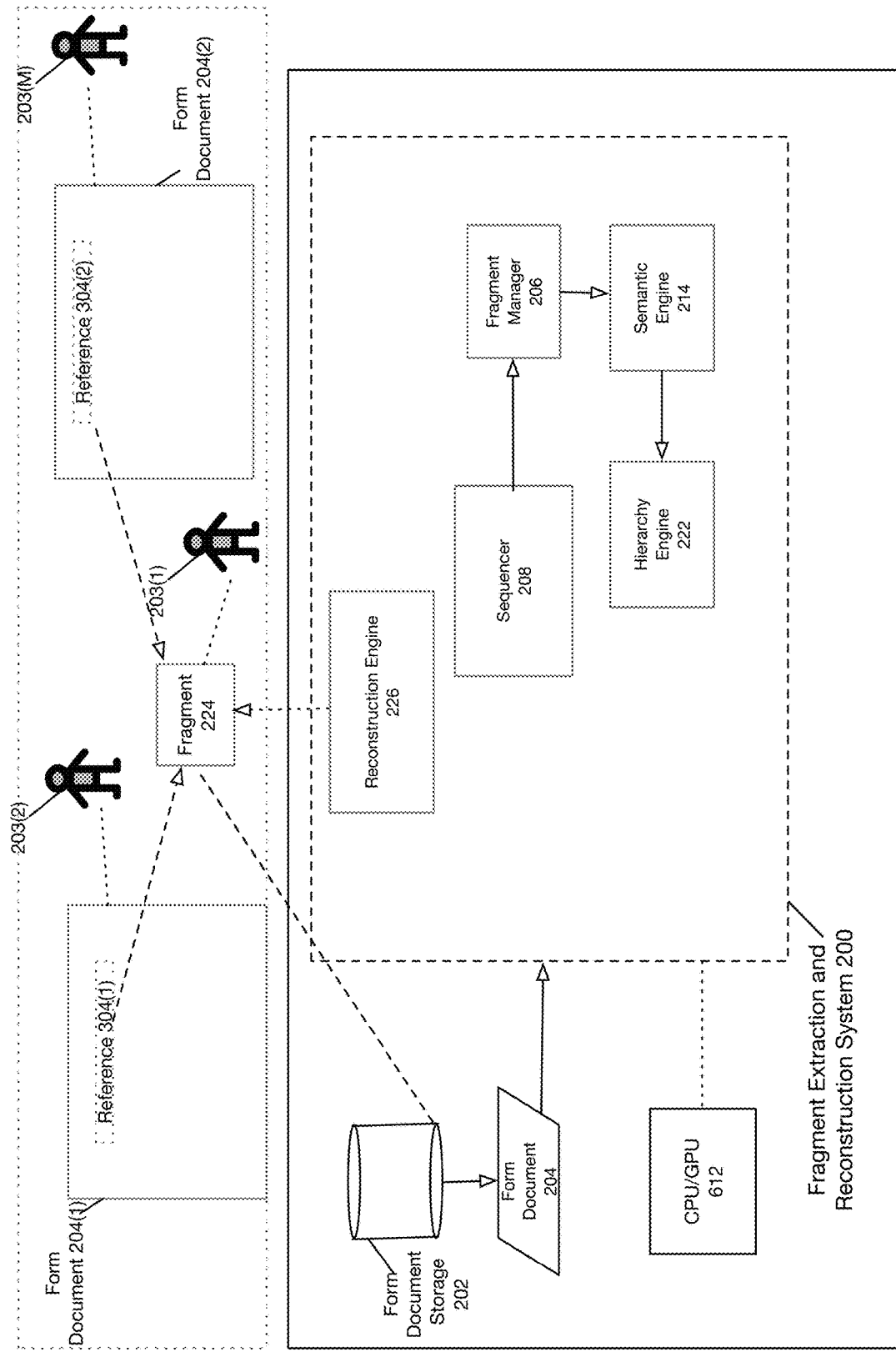
FIG. 5d depicts an example of a user interaction with a fragment extraction and reconstruction system according to one embodiment of the present disclosure.

FIG. 5*d* depicts an example of a user interaction with a fragment extraction and reconstruction system according to one embodiment of the present disclosure. As shown in FIG. 5*d*, users 203(1)-203(M) may interact with form documents 204(1)-204(2) via reconstruction engine 226. Form documents 204(1)-204(2) may each include respective references (i.e., 304(1)-304(2)) to fragment 224. As depicted in FIG. 5*a*, fragment 224 may be stored in form document storage 202 along with form documents 204(1)-204(2). Thus, for example, users 203(2) and 203(M) may interact with respective form documents 204(1)-204(2) whereby fragment 224 is retrieved and displayed via respective references 304(1)-304(2). On the other hand, user 203(1) may edit fragment 224. In doing so, changes to fragment 224 may be reflected across both form documents 204(1)-204(2) via respective references 304(1)-304(2).

Figure 6A:
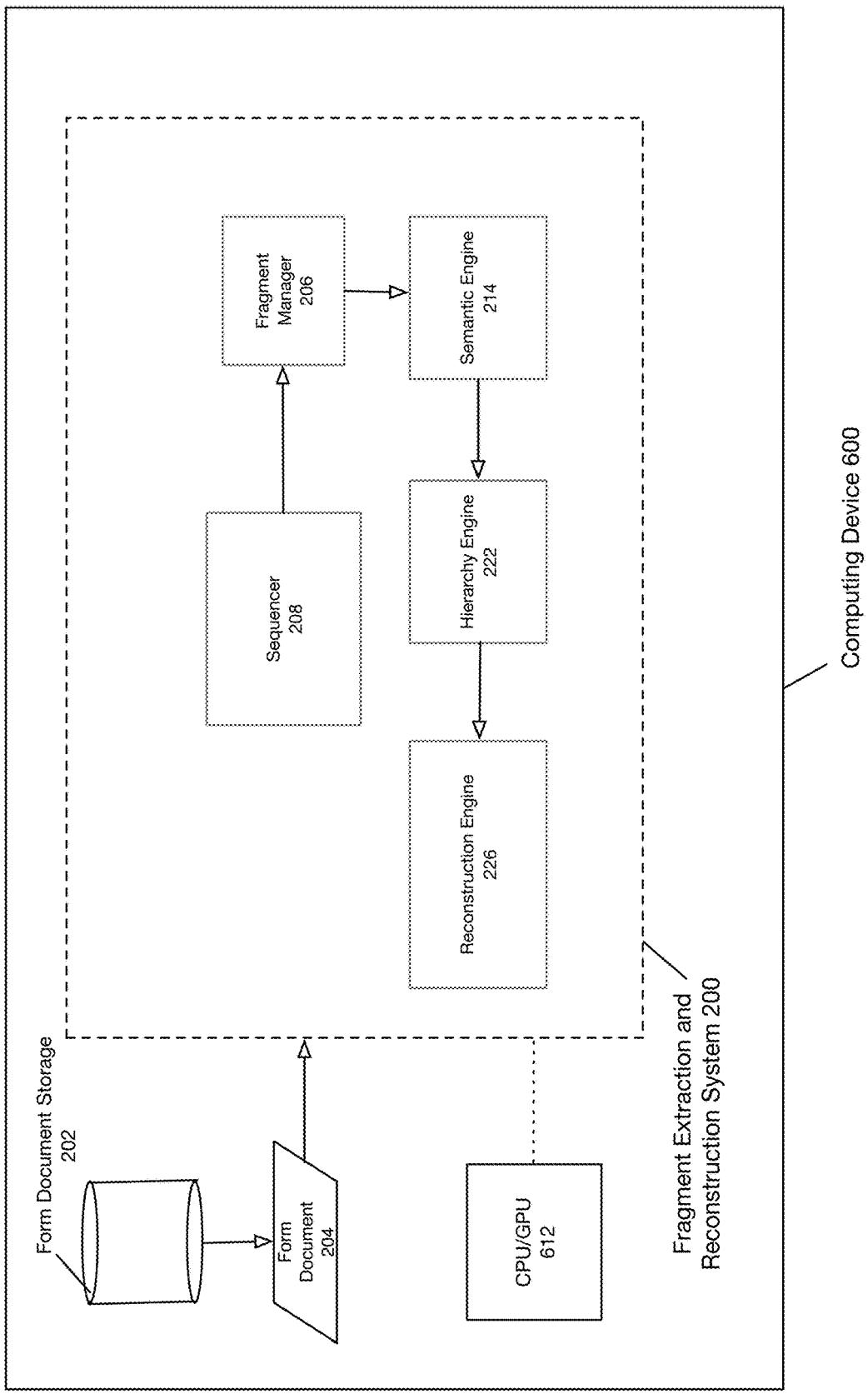
FIG. 6a illustrates an example computing system that executes a fragment extraction and reconstruction system in accordance with one embodiment of the present disclosure.

FIG. 6*a* illustrates an example computing system that executes a fragment extraction and reconstruction system in accordance with one embodiment of the present disclosure. As depicted in FIG. 6*a*, computing device 600 includes CPU/GPU 612 and fragment extraction and reconstruction system 200. CPU/GPU 612 may be configured via programmatic instructions to execute fragment extraction and reconstruction system 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. For instance, project store 106 may be external to the computing device 600. Computing device 600 can be any stand-alone computing platform, such as a desk top or work station computer, laptop computer, tablet computer, smart phone or personal digital assistant, game console, set-top box, or other suitable computing platform.

Figure 6B:
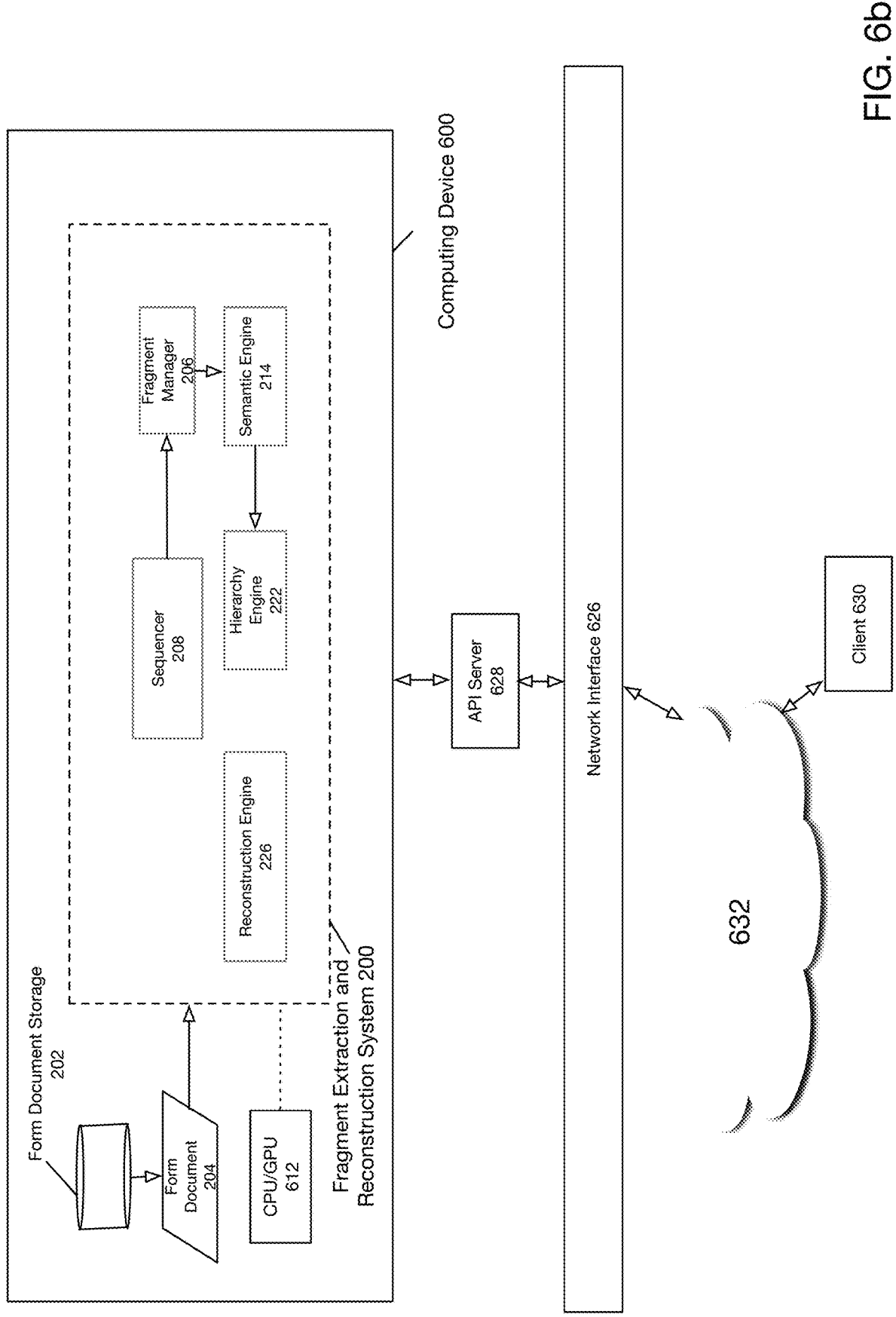
FIG. 6b illustrates an example integration of a fragment extraction and reconstruction system into a network environment according to one embodiment of the present disclosure.

FIG. 6*b* illustrates an example integration of a fragment extraction and reconstruction system into a network environment according to one embodiment of the present disclosure. As depicted in FIG. 6*b*, computing device 600 may be collocated in a cloud environment, data center, local area network ("LAN") etc. Computing device 600 shown in FIG. 6*b* is structured identically to the example embodiment described with respect to FIG. 6*a*. In this instance, computing device 600 may be a server or server cluster, for example. As shown in FIG. 6*b*, client 630 interacts with computing device 600 via network 632. In particular, client 630 may make requests and receive responses via API calls received at API server 628, which are transmitted via network 632 and network interface 626. It will be understood that network 632 may comprise any type of public or private network including the Internet or LAN.

It will be further readily understood that network 632 may comprise any type of public and/or private network including the Internet, LANs, WAN, or some combination of such networks. In this example case, computing device 600 is a server computer, and client 630 can be any typical personal computing platform As will be further appreciated, computing device 600, whether the one shown in FIG. 6*a* or 6*b*, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media) for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 632, may be implemented in software, such as a set of instructions (e.g., HTML, XML, C, C++, object-oriented C, JavaScript, Java, BASIC, etc.) encoded on any non-transitory computer readable medium or computer program product (e.g., hard drive or solid-state drive, server, disc, magnetic tape, thumb-drive, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

FURTHER EXAMPLE EMBODIMENTS

The following examples pertain to further embodiments, from which numerous permutations and configurations will be apparent.

Example 1 is a method for extracting fragments in a digital document, the method comprising: indexing said document to generate a document element ID sequence; processing said document element ID sequence to generate at least one fragment candidate; processing said at least one fragment candidate to generate at least one respective fragment; and, utilizing said at least one fragment to perform a reconstruction of said document.

Example 2 includes the subject matter of Example 1, wherein indexing comprises: updating a suffix array based upon said document; updating a generalized longest common prefix (GLCP) array utilizing said suffix array; and, returning a suffix array index corresponding to said document element ID sequence.

Example 3 includes the subject matter of Example 2, wherein said GLCP array is utilized to enforce a minimum occurrence parameter ("min_occur") of said at least one fragment candidate.

Example 4 includes the subject matter of Example 2 or 3, wherein an ith element of said GLCP array is a minimum among the ith through (i+min_occur−2)th elements of an LCP array.

Example 5 includes the subject matter of any of Examples 2 through 4, wherein processing said document element ID sequence to generate at least one fragment candidate further comprises: for an element in said element ID sequence: determining a position of said element in said GLCP array; determining a fragment_size parameter over min_occur elements in said GLCP array; and, if said fragment_size parameter exceeds a min_size parameter, updating a data structure to reflect said position and said fragment_size parameter.

Example 6 includes the subject matter of any of the preceding Examples, wherein said reconstruction of said document comprises replacing said fragment with a reference, wherein said reference is associated with said removed fragment.

Example 7 includes the subject matter of any of the preceding Examples, wherein processing said at least one fragment candidate to generate at least one respective fragment comprises applying a machine learning process to each of said at least one respective fragment candidate to filter a portion of said fragment candidates.

Example 8 is a fragment extraction and reconstruction system comprising: a sequencer for sequencing a document element from a document; an indexer for indexing said document element; a fragment extractor for performing a candidate fragment extraction; and, a semantic engine for generating a fragment from said fragment candidate.

Example 9 includes the subject matter of Example 8, wherein said indexer: updates a suffix array based upon said document; updates a generalized longest common prefix (GLCP) array utilizing said suffix array; and, returns a suffix array index corresponding to said document element ID sequence.

Example 10 includes the subject matter of Example 9, wherein said GLCP array is utilized to enforce a minimum occurrence parameter ("min_occur") of said fragment candidate.

Example 11 includes the subject matter of Example 9 or 10, wherein an ith element of said GLCP array is a minimum among the ith through (i+min_occur−2)th elements of an LCP array.

Example 12 includes the subject matter of any of Examples 9 through 11, wherein said fragment extractor: for an element in an element ID sequence: determines a position of said element in said GLCP array; determines a fragment_size parameter over min_occur elements in said GLCP array; and, if said fragment_size parameter exceeds a min_size parameter, updates a data structure to reflect said position and said fragment_size parameter.

Example 13 includes the subject matter of any of Examples 8 through 12, and further includes a reconstruction engine.

Example 14 includes the subject matter of Example 13, wherein said reconstruction engine is configured to replace said fragment with a reference, wherein said reference is associated with said removed fragment.

Example 15 is a computer program product including one or more non-transitory machine-readable mediums encoded with instructions that when executed by one or more processors cause a process to be carried out for performing fragment extraction and reconstruction, said process comprising: indexing a document to generate a document element ID sequence; processing said document element ID sequence to generate at least one fragment candidate; processing said at least one fragment candidate to generate at least one respective fragment; and, utilizing said at least one fragment to perform a reconstruction of said document.

Example 16 includes the subject matter of Example 15, wherein indexing comprises: updating a suffix array based upon said document; updating a generalized longest common prefix (GLCP) array utilizing said suffix array; and, returning a suffix array index corresponding to said document element ID sequence. Example 17 includes the subject matter of Example 16, wherein said GLCP array is utilized to enforce a minimum occurrence parameter ("min_occur") of said at least one fragment candidate.

Example 18 includes the subject matter of Example 16 or 17, wherein an ith element of said GLCP array is a minimum among the ith through (i+min_occur−2)th elements of an LCP array.

Example 19 includes the subject matter of any of Examples 16 through 18, wherein processing said document element ID sequence to generate at least one fragment candidate comprises: for an element in said element ID sequence: determining a position of said element in said GLCP array; determining a fragment_size parameter over min_occur elements in said GLCP array; and, if said fragment_size parameter exceeds a min_size parameter, updating a data structure to reflect said position and said fragment_size parameter.

Example 20 includes the subject matter of any of Examples 15 through 19, wherein said reconstruction of said document comprises replacing said fragment with a reference, wherein said reference is associated with said removed fragment.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for extracting document fragments, the method comprising:
receiving a document comprising a set of document elements;

extracting and serializing the document elements to generate a document element identifier (ID) sequence that comprises a list of the document elements;

generating a suffix array that includes a plurality of suffixes of the document element ID sequence arranged according to a defined order;

generating a longest common prefix (LCP) array including a LCP between ith and (i+1)th elements of the suffix array;

updating a generalized longest common prefix (GLCP) array that indicates a maximum size of the plurality of suffixes that occur at least a min_occur number of times between the ith and the (ith+min_occur) elements in the LCP array;

identifying, from the plurality of suffixes in the GLCP array having the maximum size of the plurality of suffixes that occur at least the min_occur number of times, a particular fragment candidate having a fragment size greater than a minimum fragment size;

deconstructing the particular fragment candidate to generate a plurality of enhanced fragments, each of which forms a part of the particular fragment candidate; and using the enhanced fragments to reconstruct the document.

2. The method according to claim 1, wherein:
the defined order is an alphabetical order; and
each of the suffixes of the document element ID sequence is associated with a suffix array index that is sequentially incrementing when the suffixes are arranged in the defined order.

3. The method according to claim 1, wherein an ith element of said GLCP array is a minimum among ith through (i+min_occur −2)th elements of the LCP array.

4. The method according to claim 1, further comprising:
determining a position of a particular element in the GLCP array;
determining a fragment_size parameter over min_occur elements in the GLCP array; and,
if said fragment size parameter exceeds the threshold size, updating a data structure to reflect said position and said fragment size parameter.

5. The method according to claim 1, further comprising replacing a particular enhanced fragment with a reference associated with said particular enhanced fragment.

6. The method according to claim 1, wherein a plurality of fragment candidates having respective sizes greater than the minimum fragment size are identified, and wherein deconstructing the particular fragment candidate to generate the plurality of enhanced fragments comprises applying a machine learning process to the plurality of fragment candidates to filter said fragment candidates.

7. A fragment extraction and reconstruction system comprising:
one or more processors;
a sequencer, executed by the one or more processors, configured to serialize document elements extracted from a document, and generate a document element identifier (ID) sequence that comprises a list of the serialized document elements;
an indexer, executed by the one or more processors, configured to (a) generate a suffix array that includes a plurality of suffixes of the document element ID sequence arranged according to a defined order and (b) generate a longest common prefix (LCP) array including a LCP between ith and (i+1)th elements of the suffix array;
a fragment manager, executed by the one or more processors, configured to (a) update a generalized longest common prefix (GLCP) array that indicates a maximum size of the plurality of suffixes that occur at least a min_occur number of times between the ith and the (ith+min_occur) elements in the LCP array, and (b) identify, from the plurality of suffixes in the GLCP array having the maximum size of the plurality of suffixes that occur at least the min_occur number of times, a particular fragment candidate having a fragment size greater than a minimum fragment size; and
a reconstruction engine, executed by the one or more processors, configured to use the particular fragment candidate to reconstruct the document.

8. The fragment extraction and reconstruction system according to claim 7, wherein:
the defined order is an alphabetical order; and
each of the suffixes of the document element ID sequence is associated with a suffix array index that is sequentially incrementing when the suffixes are arranged in the defined order.

9. The fragment extraction and reconstruction system according to claim 7, further comprising a semantic engine, executed by the one or more processors, configured to deconstruct the particular fragment candidate to generate a plurality of enhanced fragments, at least one of which forms part of the particular fragment candidate, wherein the reconstruction engine is further configured to use the enhanced fragments to reconstruct the document.

10. The fragment extraction and reconstruction system according to claim 7, wherein an ith element of said GLCP array is a minimum among ith through (i+min_occur −2)th elements of the LCP array.

11. The fragment extraction and reconstruction system according to claim 7, wherein said fragment manager is further configured to:
determine a position of a particular element in said GLCP array;
determine a fragment_size parameter over min_occur elements in said GLCP array; and,
if said fragment_size parameter exceeds the threshold size, update a data structure to reflect said position and said fragment_size parameter.

12. The fragment extraction and reconstruction system according to claim 9, wherein a plurality of fragment candidates having respective sizes greater than the threshold size are identified, and wherein deconstructing the particular fragment candidate to generate the plurality of enhanced fragments comprises applying a machine learning process to the plurality of fragment candidates to filter the fragment candidates.

13. The fragment extraction and reconstruction system according to claim 9, wherein said reconstruction engine is further configured to replace a particular enhanced said fragment with a reference associated with said particular enhanced fragment.

14. A computer program product including one or more non-transitory machine-readable mediums encoded with instructions that when executed by one or more processors cause a process to be carried out for performing fragment extraction and reconstruction, said process comprising:
receiving a document comprising a set of document elements;
extracting and serializing the document elements to generate a document element identifier (ID) sequence that comprises a list of the document elements;

generating a suffix array that includes a plurality of suffixes of the document element ID sequence arranged according to a defined order;

generating a longest common prefix (LCP) array including a LCP between ith and (i+1)th elements of the suffix array;

updating a generalized longest common prefix (GLCP) array that indicates a maximum size of the plurality of suffixes that occur at least a min_occur number of times between the ith and the (ith+min_occur) elements in the LCP array;

identifying, from the plurality of suffixes in the GLCP array having the maximum size of the plurality of suffixes that occur at least the rnin_occur number of times, a particular fragment candidate having a fragment size greater than a minimum fragment size; and using the particular fragment candidate to reconstruct the document.

15. The computer program product according to claim 14, wherein:

the defined order is an alphabetical order; and each of the suffixes of the document element ID sequence is associated with a suffix array index that is sequentially incrementing when the suffixes are arranged in the defined order.

16. The computer program product according to claim 14, wherein the process further comprises deconstructing the particular fragment candidate to generate a plurality of enhanced fragments, at least one of which forms part of the particular fragment candidate, and using the enhanced fragments to reconstruct the document.

17. The computer program product according to claim 16, wherein the process further comprises replacing a particular enhanced fragment with a reference associated with said particular enhanced fragment.

18. The computer program product according to claim 14, wherein an ith element of said GLCP array is a minimum among ith through (i+min_occur −2)th elements of the LCP array.

19. The computer program product according to claim 14, wherein the process further comprises:

determining a position of a particular element in said GLCP array;

determining a fragment size parameter over min_occur elements in said GLCP array; and, if said fragment_size parameter exceeds the threshold size, updating a data structure to reflect said position and said fragment_size parameter.

* * * * *